(12) United States Patent
Bostick et al.

(10) Patent No.: US 10,001,916 B2
(45) Date of Patent: Jun. 19, 2018

(54) DIRECTIONAL INTERFACE FOR STREAMING MOBILE DEVICE CONTENT TO A NEARBY STREAMING DEVICE

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 14/865,186

(22) Filed: Sep. 25, 2015

(65) Prior Publication Data

US 2017/0090711 A1 Mar. 30, 2017

(51) Int. Cl.
*G06F 3/0488* (2013.01)
*H04W 4/02* (2018.01)
*G06F 3/01* (2006.01)
*G06F 3/0482* (2013.01)
*G06F 3/0484* (2013.01)

(52) U.S. Cl.
CPC ............ *G06F 3/0488* (2013.01); *G06F 3/017* (2013.01); *G06F 3/0482* (2013.01); *G06F 3/04842* (2013.01); *H04W 4/02* (2013.01)

(58) Field of Classification Search
CPC ....... G06F 3/0488; G06F 3/0482; G06F 3/017
See application file for complete search history.

(56) References Cited

U.S. PATENT DOCUMENTS

| 8,179,816 | B1 | 3/2012 | Vaidyanathan et al. |
| 9,218,122 | B2 | 12/2015 | Thomas et al. |
| 2007/0219659 | A1 | 9/2007 | Abhyanker et al. |
| 2009/0048767 | A1 | 2/2009 | Vaughn |
| 2013/0226444 | A1* | 8/2013 | Johansson ............ G06F 3/0488 701/300 |
| 2014/0066093 | A1* | 3/2014 | Yoo ........................ G01S 5/0072 455/456.1 |
| 2014/0143061 | A1 | 5/2014 | Abhyanker |

(Continued)

OTHER PUBLICATIONS

Broadcom News Release, "Broadcom Enables Pinpoint Indoor Location Technology with Latest 5G WiFi SoC", Apr. 1, 2014.

(Continued)

*Primary Examiner* — Sherrod Keaton
(74) *Attorney, Agent, or Firm* — Martin & Associates, LLC; Derek P. Martin

(57) ABSTRACT

A mobile device includes a directional streaming mechanism that causes digital content to be streamed to one or more nearby devices based on a gesture on the touch screen of the mobile device, such as the swipe of a finger. The mobile device and nearby devices each include a position mechanism that allows each device to know the position of other devices within a given range. When a user is streaming digital content to the mobile device, the user can swipe a finger on a touch screen display in the direction of one of the streaming devices in range of the mobile device, which results in the mobile device streaming the digital content to the streaming device in the direction of the finger swipe. The streaming device in the direction of the finger swipe can then play the digital content received from the mobile device.

11 Claims, 6 Drawing Sheets

(56) References Cited

U.S. PATENT DOCUMENTS

2014/0274116 A1     9/2014   Xu et al.
2014/0281012 A1     9/2014   Troxler et al.

OTHER PUBLICATIONS

Wyman, B. "Facilitating Profiling-Based Linkage Ordering", ip.com IPCOM000117191, Mar. 31, 2005.
Naranjo et al, "Rich Media Visualization for Geo-Spatial Mapping Platforms", ip.com IPCOM000182021D, Apr. 22, 2009.
Peng et al., "The Multi-Agents Mechanism Applied in Mobile GIS", Proceedings of the 2005 International Conference on Wireless Communications, Networking and Mobile Computing, p. 1365-1369, Sep. 2005.
Google Translation of Chinese Patent CN203352726 U, "DLNA/Airplay/Miracast wireless technology-based audio/video player", Dec. 18, 2013.

\* cited by examiner

DIRECTIONAL INTERFACE FOR STREAMING MOBILE DEVICE CONTENT TO A NEARBY STREAMING DEVICE

BACKGROUND

1. Technical Field

This disclosure generally relates to streaming digital content, and more specifically relates to streaming digital content to a nearby streaming device based on a gesture by a user on the display of a mobile device.

2. Background Art

Streaming digital content has become very popular in recent years. Many people stream digital music using online music services such as Pandora. For example, many vehicles support a wireless connection to a mobile device such as a smart phone, and allow a user to listen to music played by the smart phone via the vehicle's audio system. Many users stream digital television shows or movies using online video services such as Netflix or Hulu.

More recent developments allow streaming digital content from a mobile device to other nearby devices. For example, many modern devices support the Digital Living Network Alliance (DLNA), which is a standard for allowing devices to share digital content. Other technologies that allow streaming digital content include Apple AirPlay and Google Cast. In addition, mobile devices can share links or media with other mobile devices through the user of mobile technologies such as Bluetooth LE and Apple AirDrop.

SUMMARY

A mobile device includes a directional streaming mechanism that causes digital content to be streamed to one or more nearby devices based on a gesture on the touch screen of the mobile device, such as the swipe of a finger. The mobile device and nearby devices each include a position mechanism that allows each device to know the position of other devices within a given range. When a user is streaming digital content to the mobile device, the user can swipe a finger on a touch screen display in the direction of one of the streaming devices in range of the mobile device, which results in the mobile device streaming the digital content to the streaming device in the direction of the finger swipe. The streaming device in the direction of the finger swipe can then play the digital content received from the mobile device.

The foregoing and other features and advantages will be apparent from the following more particular description, as illustrated in the accompanying drawings.

BRIEF DESCRIPTION OF THE DRAWING(S)

The disclosure will be described in conjunction with the appended drawings, where like designations denote like elements, and:

DETAILED DESCRIPTION

The disclosure and claims herein relate to a mobile device that includes a directional streaming mechanism that causes digital content to be streamed to one or more nearby devices based on a gesture on the touch screen of the mobile device, such as the swipe of a finger. The mobile device and nearby devices each include a position mechanism that allows each device to know the position of other devices within a given range. When a user is streaming digital content to the mobile device, the user can swipe a finger on a touch screen display in the direction of one of the streaming devices in range of the mobile device, which results in the mobile device streaming the digital content to the streaming device in the direction of the finger swipe. The streaming device in the direction of the finger swipe can then play the digital content received from the mobile device.

For the purposes of the discussion herein, the terms "streaming digital content to a streaming device" and "sending streaming data to a streaming device" are used as equivalent terms. Both denote the mobile device sending digital content that is streamed to one or more devices that are capable of playing the digital content.

Figure 1:
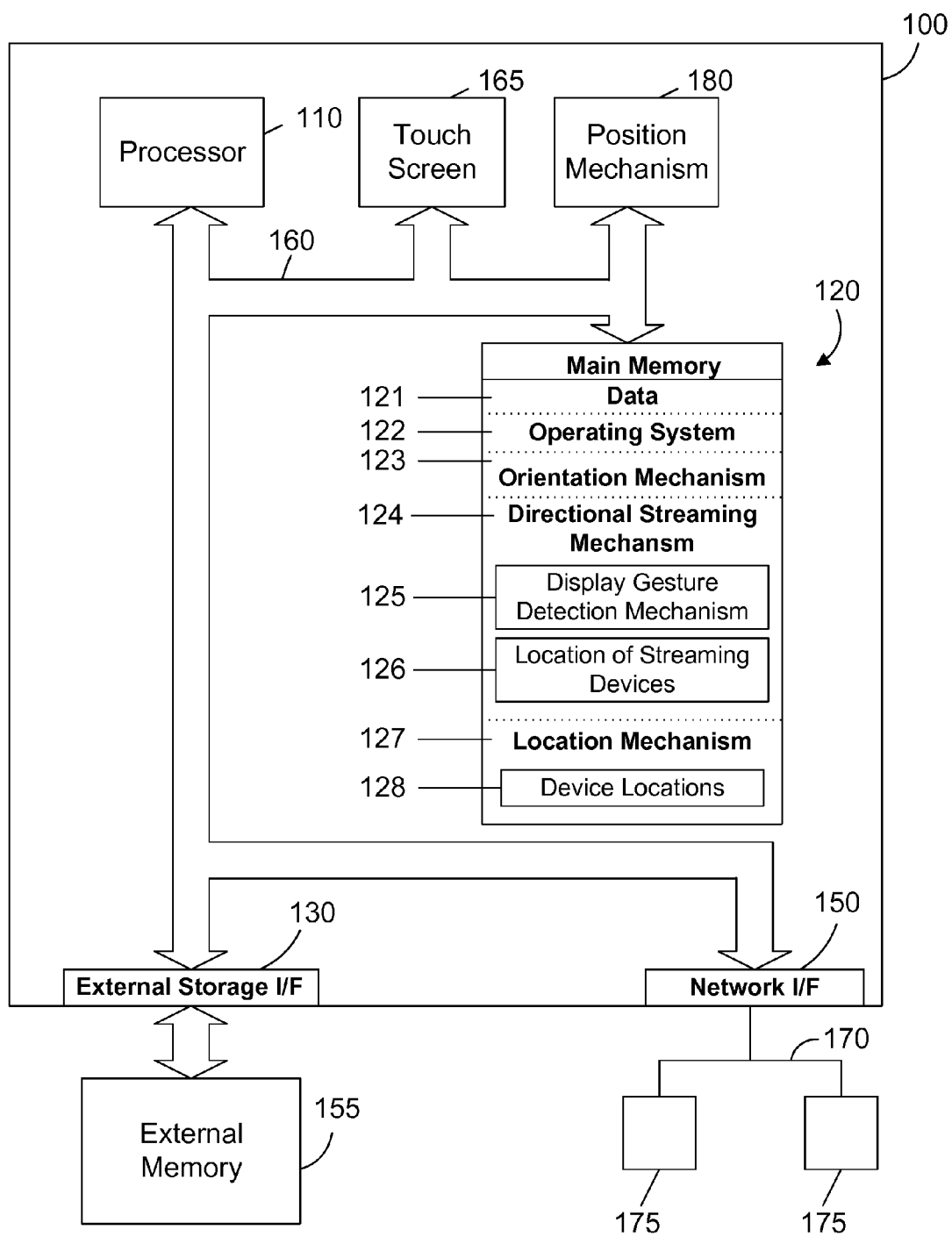
FIG. 1 is a block diagram of a mobile device.

Referring to FIG. 1, a mobile device 100 represents any suitable type of mobile device, including without limitation a smart phone, tablet computer, electronic book reader, notebook computer, laptop computer, gaming console, smart watch, etc. Those skilled in the art will appreciate that the disclosure herein applies equally to any type of mobile device. As shown in FIG. 1, mobile device 100 comprises one or more processors 110, a main memory 120, an external storage interface 130, a network interface 150, a touch screen 165, and a position mechanism 180. These system components are interconnected through the use of a system bus 160. External storage interface 130 is used to access external memory. One specific type of external memory 155 is non-volatile memory on an external device, such as an SD card, a micro-SD card, or a thumb drive.

Main memory 120 preferably contains data 121, an operating system 122, an orientation mechanism 123, a directional streaming mechanism 124, and a location mechanism 127. Data 121 represents any data that serves as input to or output from any program in mobile device 100. Operating system 122 could be any suitable operating system for a mobile device. Known operating systems for mobile devices include the iOS operating system developed by Apple Computer, the Android operating system developed by Google, and the Windows Phone operating system developed by Microsoft.

The orientation mechanism 123 allows the mobile device 100 to determine its physical orientation in space. Known mobile devices include one or more accelerometers as an orientation mechanism 123 that allow determining the device's physical orientation in space, meaning both physical location and angle or direction of the mobile device at that physical location. One such use of a device's orientation mechanism 123 is to rotate the screen when the orientation of the screen is moved by a user from portrait to landscape position, and vice versa. The orientation mechanism 123 could include a built-in electronic compass to determine which direction the mobile device is pointing. Orientation mechanism 123 is well-known in the art of mobile devices, and therefore is not discussed in more detail here.

The directional streaming mechanism 124 allows a user to send streaming content to a nearby device by simply making a suitable gesture on the touch screen 165, such as a finger swipe. The directional streaming mechanism 124 includes a display gesture detection mechanism 125 and location of streaming devices 126. The location mechanism 127 is used to determine device locations 128 for all devices within a given range of the mobile device 100. Because not all devices detected by the location mechanism 127 are necessarily streaming devices, the location of streaming devices 126 preferably includes a list of those devices that are streaming devices, along with the location as determined by the location mechanism 127. The location mechanism can use suitable hardware such as a position mechanism 180 to determine the positions of streaming devices within range of the mobile device.

Note the term "within range of the mobile device" can mean within any suitable range using any suitable technology. For example, when the mobile device communicates with multiple streaming devices via Bluetooth, what is "within range of the mobile device" is dependent on the physical limitations of the Bluetooth standard for communicating between paired devices. When the mobile device communicates with multiple streaming devices via WiFi, what is "within range of the mobile device" can include all streaming devices that are connected to the same router or access point on the WiFi network. The disclosure and claims herein extend to any suitable way and technology to determine whether a streaming device is within range of the mobile device. For the purpose of the discussion herein, when a streaming device is "within range of the mobile device" using any suitable technology or criteria, the streaming device is deemed to be nearby the mobile device.

A system known as an Internal Positioning System (IPS) is intended for indoor use, and allows electronic devices to communicate with each other and determine their location with respect to each other. In one suitable embodiment, the position mechanism 180 is a chip or chipset that supports IPS, and that communicates with corresponding chips or chipsets in other devices to determine device locations 128 and to determine location of streaming devices 126. One suitable implementation for IPS is a 5G WiFi (802.11ac) system-on-chip (SoC) developed by Broadcom, and known as BCM43462. This SoC is one suitable implementation for position mechanism 180 shown in FIG. 1. Because IPS is well-known in the art, and the Broadcom SoC delivers ISP functionality to devices, the preferred implementation for the position mechanism 180 is the Broadcom SoC referenced above. Of course, other technologies besides ISP could also be used to determine position of electronic devices with respect to each other. For example, signal strength of a Bluetooth connection could be used to determine distance to another device. The disclosure and claims herein extend to any suitable position mechanism 180, whether currently known or developed in the future.

The display gesture detection mechanism 125 monitors the touch screen 165 for gestures by the user, such as a finger swipe, and takes action when a defined user gesture is detected while streaming digital content or before streaming digital content. Because the mobile device 100 knows its own orientation in space using its orientation mechanism 123, and knows location of streaming devices 126, the display gesture detection mechanism 125 can detect when a user performs a gesture, such as a finger swipe, on the touch screen 165 and identify a streaming device that is in the approximate direction of the finger swipe. The directional streaming mechanism 124 thus allows a user to stream digital content to a streaming device by simply swiping a finger on the touch screen towards the streaming device. The function of the directional streaming mechanism 124 is discussed in more detail below.

Main memory 120 may include any suitable combination of different memory types. For example, main memory 120 could include dynamic random access memory (DRAM) that has a relatively small size and a fast access time and could also include non-volatile memory (NVRAM) that has a much larger size and a slower access time. Programs stored in NVRAM could then be loaded into the DRAM in order to be executed by the processor 110. This simple example shows the main memory 120 can include any suitable number and type of memories in any suitable hierarchy, whether currently known or developed in the future.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the orientation mechanism 123, directional streaming mechanism 124, and location mechanism 127 under the control of the operating system 122.

Although mobile device 100 is shown to contain only a single processor and a single system bus, those skilled in the art will appreciate that a directional streaming mechanism may be practiced using a mobile device that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Touch screen 165 is a display that allows the user to select functions on the mobile device 100 by touching the touch screen 165 and by making one or more gestures on the touch screen 165, such as a finger swipe. Finger swipes are well-known in the art of smart phones and other mobile devices, and can be used to discard tasks or calendar events, to move items to a different location, etc.

Network interface 150 is used to connect mobile device 100 to a network 170. Network interface 150 broadly represents any suitable way to interconnect electronic devices, such as mobile device 100, to streaming devices 175, regardless of whether the network 170 comprises present-day analog and/or digital techniques or via some networking mechanism of the future. Network interface 150 preferably includes a combination of hardware and software that allow communicating on the network 170. The network interface 150 can include multiple different network interfaces. For example, network interface 150 could include a wireless interface for communicating with a 4G network, a WiFi interface for communicating with a WiFi network, and a Bluetooth interface for communicating with other devices via Bluetooth. Software in the network interface 150 preferably includes a communication manager that manages communication with streaming devices 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of this disclosure may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
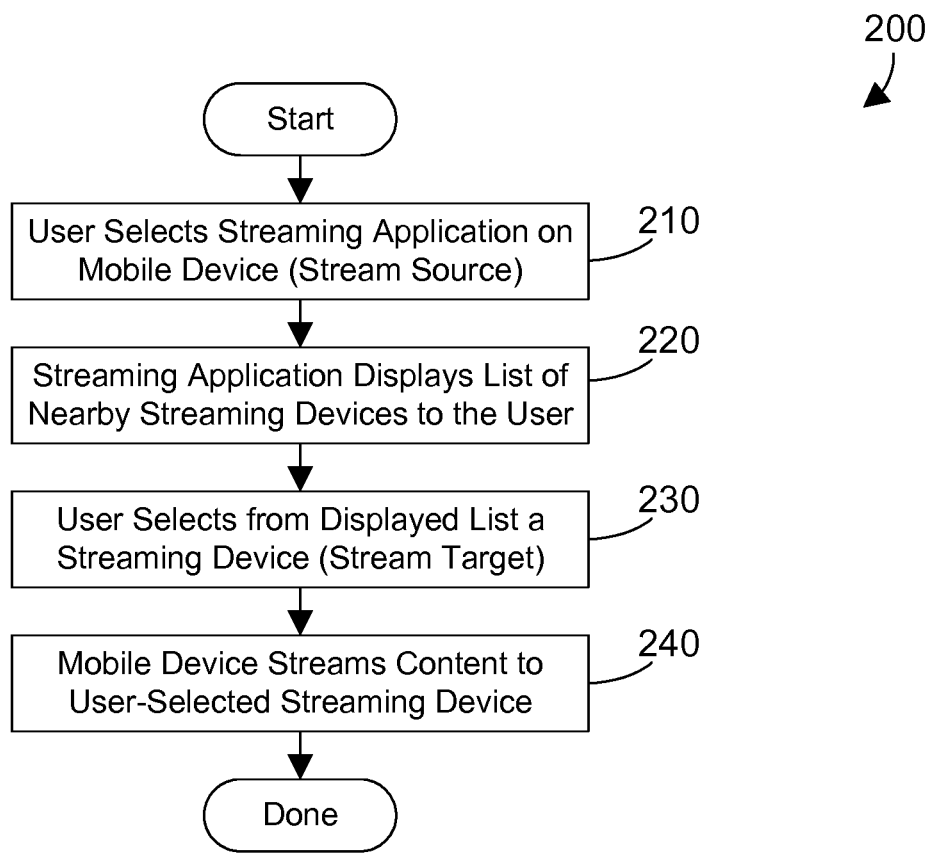
FIG. 2 is a flow diagram of a prior art method for streaming digital content from a mobile device to another device in range of the mobile device.

The prior art allows a mobile device to stream digital content to other compatible devices. For example, Digital Living Network Alliance (DLNA) is a standard for streaming digital content between different devices that are on the same WiFi network. Let's assume a user has a smart phone that supports DLNA and a Blu-ray player that supports DLNA. The user can stream audio or video data to the Blu-ray player via DLNA. Method 200 in FIG. 2 shows the prior art steps for a user to stream digital content from a mobile device, referred to herein as a "stream source", and a device capable of playing streamed digital content, referred to herein as a "stream target." The user selects a streaming application on the mobile device (step 210), which is the stream source. The streaming application displays a list of nearby streaming devices to the user (step 220). The user selects from the displayed list a streaming device (step 230), which will be the stream target. The mobile device then streams content to the user-selected streaming device (step 240). Thus, if a user wants to watch a video that is streaming to his phone on his TV, he could select the Blu-ray player in the DLNA-compatible app on the phone, which will result in the video being played via the Blu-ray player. Note this process requires a user to manually select the stream target from a displayed list of streaming devices. Often, the streaming devices are given cryptic names in the list that are difficult to correlate with the physical devices. With homes and offices having more and more wireless devices on the WiFi network, the cryptic names used to identify many devices make it difficult to determine which device the user wants. Even if the cryptic name identifies a device as a Blu-ray player, if the user has three Blu-ray players in the house, one in the master bedroom, one in the family room, and one in the downstairs recreation room, the user may not be able to tell which Blu-ray player is which from the list of cryptic names of devices. Similar problems exist in selecting devices in an office environment. The directional streaming mechanism disclosed and claimed herein solves these problems by allowing a user to easily stream digital content to a streaming device using a finger swipe in the direction of the streaming device.

Figure 3:
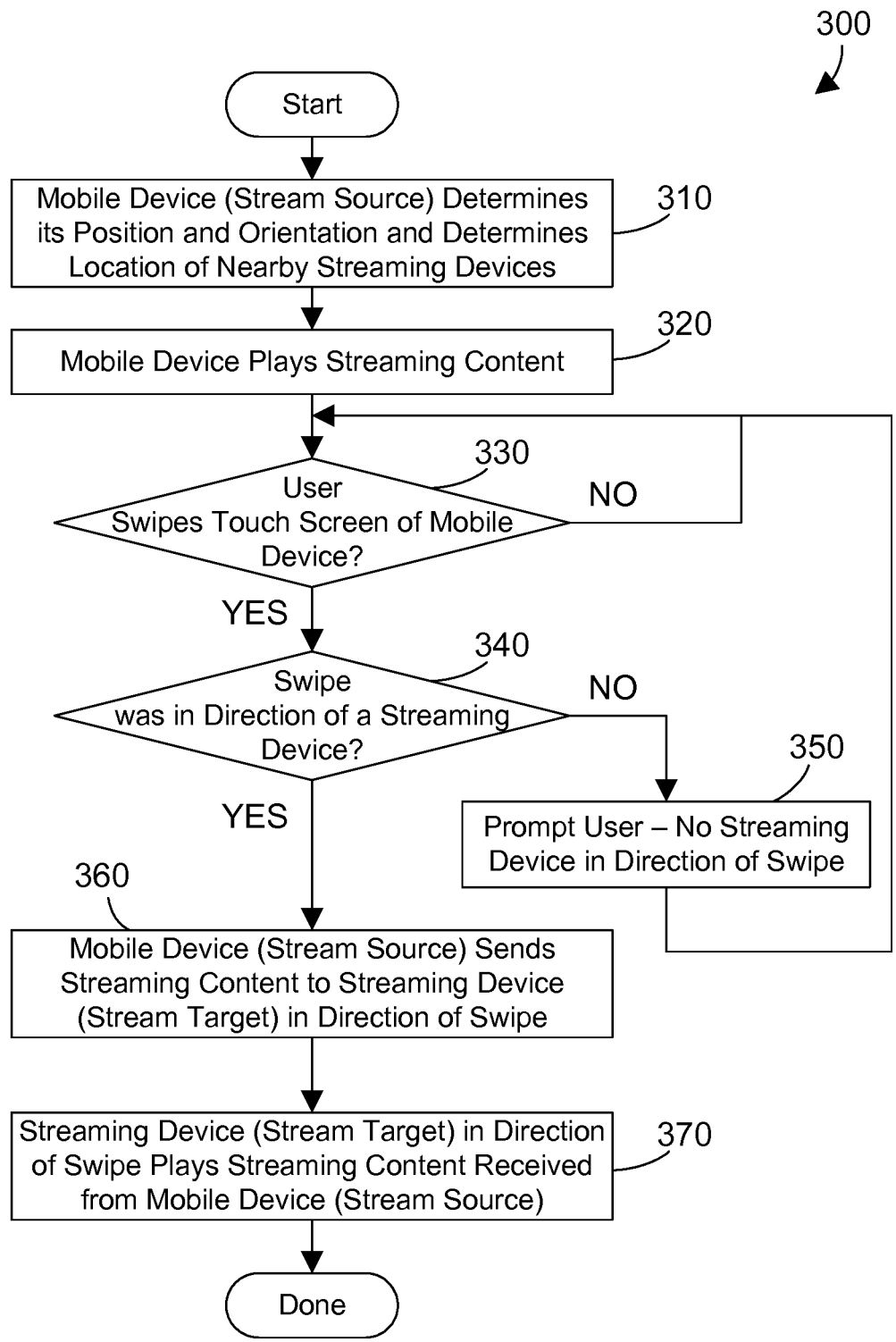
FIG. 3 is a flow diagram of a method for streaming digital content from a mobile device to another device in range of the mobile device based on a gesture such as a finger swipe by the user on the mobile device.

Referring to FIG. 3, a method 300 allows a user to stream digital content to a streaming device based on a user gesture on the display of a mobile device, such as a finger swipe. The mobile device that is the stream source determines its position and orientation and determines the location of nearby streaming devices (step 310). This can be performed using the orientation mechanism 123, the position mechanism 180, and the location mechanism 127 shown in FIG. 1. When step 310 is complete, the mobile device that is the stream source understands its own orientation as well as its location relative to the nearby streaming devices. The mobile device plays the streaming content (step 320). As long as the user does not swipe the touch screen of the mobile device (step 330=NO), method 300 waits. When the user swipes the touch screen of the mobile device (step 330=YES), method 300 determines whether the swipe was in the direction of a streaming device (step 340). If not (step 340=NO), the user is prompted that there is no streaming device in the direction of the swipe (step 350), and method 300 returns to step 330. If the swipe was in the direction of a streaming device (step 340=YES), the mobile device sends the streaming content to the streaming device that is in the direction of the swipe, which becomes the stream target (step 360). The streaming device that is the stream target in the direction of the swipe plays the streaming content received from the mobile device (step 370). Method 300 is then done.

While FIG. 3 shows the user swiping the touch screen while a mobile device plays streaming content in step 320, this is not the only mode of operation. For example, the user could invoke a media player on the mobile device, then swipe the touch screen to connect to the desired streaming device(s) before the streaming of the media starts so that when the streaming of the media starts, it will be available from the start on the desired streaming device(s). The disclosure and claims herein expressly extend to a user swiping the touch screen before starting the playing of the streaming content or during the playing of the streaming content.

Figure 4:
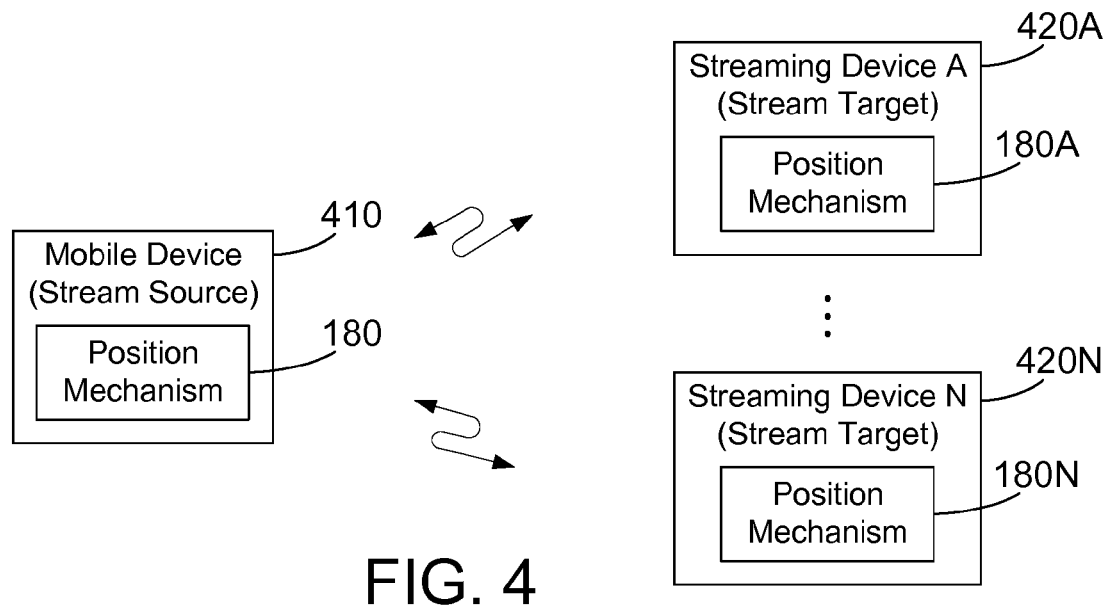
FIG. 4 is a block diagram showing a mobile device that communicates with multiple streaming devices.

FIG. 4 shows a mobile device 410 that includes a position mechanism 180, and multiple streaming devices 420A, . . . , 420N that each include corresponding position mechanisms 180A, . . . , 180N. Mobile device 410 could be the mobile device 100 shown in FIG. 1. The position mechanisms 180, 180A, . . . , 180N can use any suitable technology for determining relative position between devices, including without limitation Internal Positioning System. The mobile device 410 communicates via a wireless interface to the streaming devices 420A, . . . , 420N, and the position mechanisms 180, 180A, . . . , 180N allow the mobile device 410 to determine location of the streaming devices with respect to the mobile device 410. A knowledge of physical location of the streaming locations and location and orientation of the mobile device allows the directional streaming mechanism to stream digital content to a streaming device based on a finger swipe on the display of the mobile device.

Figure 5:
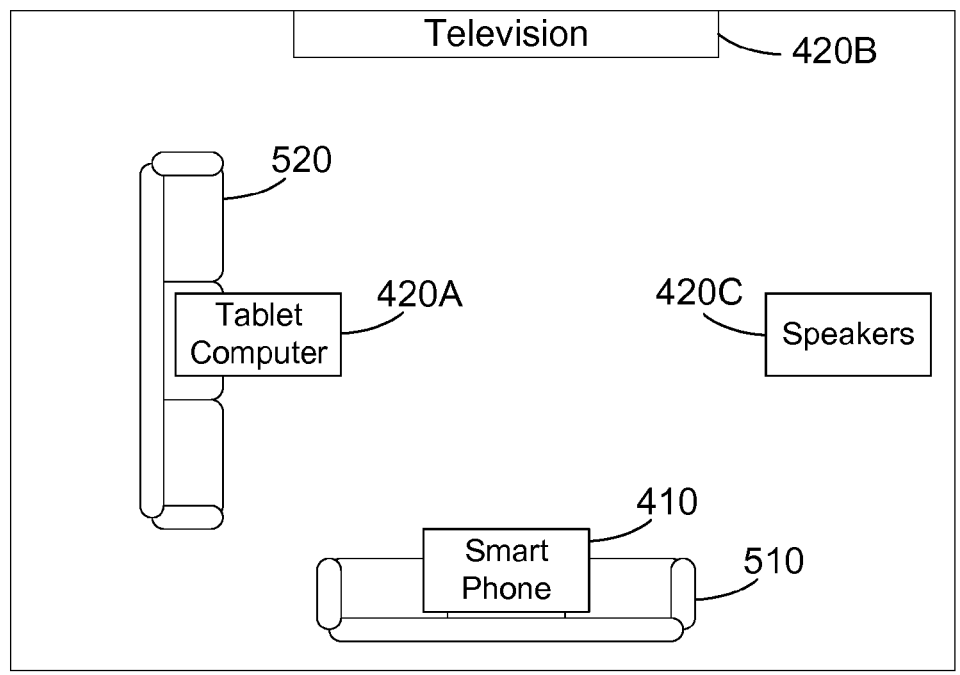
FIG. 5 is block diagram of a room that includes a smart phone, a tablet computer, a television, and wireless speakers.
Figure 6:
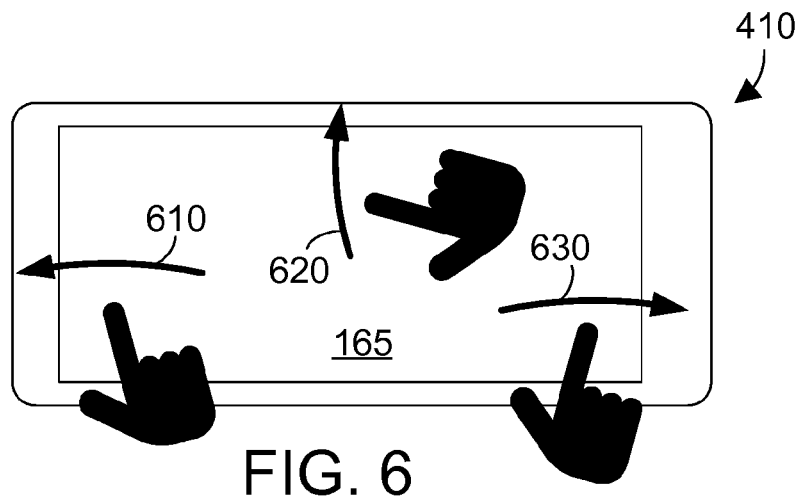
FIG. 6 is a flow diagram showing examples of how a user can swipe a finger on a touch screen display to initiate streaming digital content to a streaming device in the direction of the finger swipe.

A simple example will illustrate how the mobile device can stream digital content to a streaming device based on a finger swipe on the touch screen display of the mobile device. Referring to FIG. 5, a room layout is shown that includes a first user sitting on a couch 510 with a smart phone 410, a second user sitting on a different couch 520 using a tablet computer 420A, a television 420B on the wall in front of the couch 510, and wireless speakers 420C such as Bluetooth speakers. Note the smart phone 410 is an example of the mobile device 100 shown in FIG. 1. Let's assume the user is watching a video on the smart phone 410, and decides to stream the video to the television 420B. This can be easily done by the user swiping a finger on the touch screen 165 of the smart phone 410 in the direction of the television 420B. Referring to FIG. 6, if the user performs a finger swipe in the direction of the television 420B, as shown at 620 in FIG. 6, the video will be streamed to the television without the user having to select a device from a menu and without the user having to perform any other function. A finger swipe on the display is enough to cause the directional streaming mechanism in the smart phone to establish a connection with the TV and stream the digital content to the TV. In similar fashion, a finger swipe to the left of the touch screen 165 as shown at 610 in FIG. 6 will cause the video to be streamed to the tablet computer 420A. A finger swipe to the right of the touch screen 165 as shown at 630 in FIG. 6 will cause the video to be streamed to the speakers 420C. Of course, any suitable additional steps could be used in conjunction with the finger swipe, such as pressing a "stream" or "share" icon followed by the finger swipe to indicate the finger swipe identifies a streaming device to which the streaming content will be sent.

The example shown in FIGS. 5 and 6 and discussed herein assumes the smart phone 410 is a stream source while the tablet computer 420A, television 420B, and speakers 420C are stream targets. Note the terms "stream source" and "stream target" are relative terms that describe the current function being performed. Thus, a user using the tablet computer 420 to stream a YouTube video can share the YouTube video with the smart phone 410 using the same type of gesturing discussed above. In this context, the tablet computer becomes the stream source and the smart phone becomes the stream target. Thus, many mobile devices can be stream sources and stream targets at different times depending on the desired function.

Figure 7:
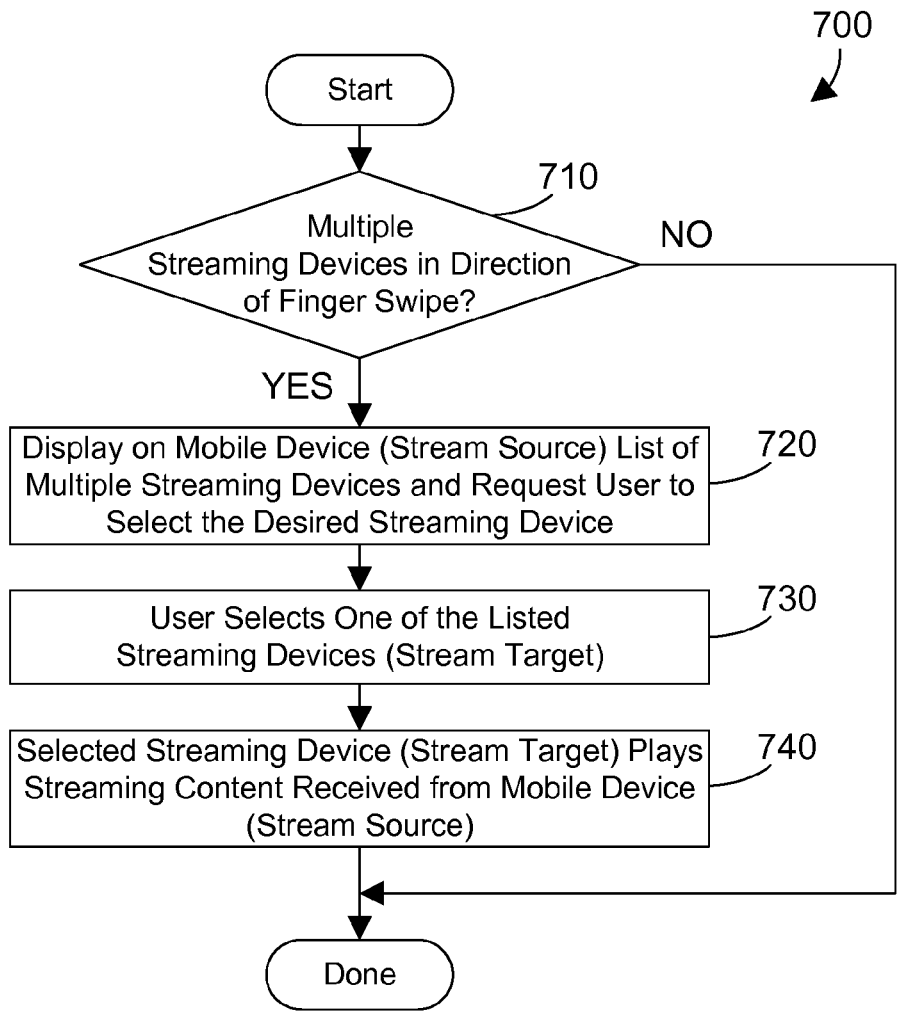
FIG. 7 is a flow diagram of a method for a mobile device to determine which streaming device the user intended when there are multiple streaming devices in the direction of the user's finger swipe.

FIG. 7 shows a method 700 that may be performed to resolve any ambiguity about which streaming device the user intended with a finger swipe. Method 700 determines if there are multiple streaming devices in the direction of the finger swipe (step 710). If not (step 710=NO), method 700 is done. If there are multiple streaming devices in the direction of a finger swipe (step 710=YES), a list is displayed on the mobile device of the multiple streaming devices that are in the direction of the finger swipe, and the user is requested to select which of these listed devices is the desired streaming device (step 720). A user selects one of the listed streaming devices (step 730), which becomes the stream target. The selected streaming device, which is the stream target, now plays the streaming content received from the mobile device (step 740). Method 700 is then done.

Note the ambiguity that is resolved by method 700 could be due to an imprecise swipe by the user, or could be due to multiple devices being in close physical proximity to each other. For example, if the user did a swipe that was at an angle between the television 420B and the speakers 420C, the user could be prompted to select which the user intended. In another example, if a Blu-ray player were located in a cabinet underneath the television 420B shown in FIG. 5, the same swipe 620 in FIG. 6 would be in the direction of both the television 420B and the Blu-ray player. A user would then have to select which one he or she intended when making the finger swipe. Method 700 resolves any ambiguity in the finger swipe by prompting the user to select which streaming device the user intended. In the alternative, ambiguity could automatically be resolved based on which streaming device is best suited to the type of content being streamed. Thus, if the user swipe was at an angle between the television 420B and the speakers 420C, if the content being streamed is video, the television 420B could be selected, while if the content being streamed is audio, the speakers 420C could be automatically selected.

Figure 8:
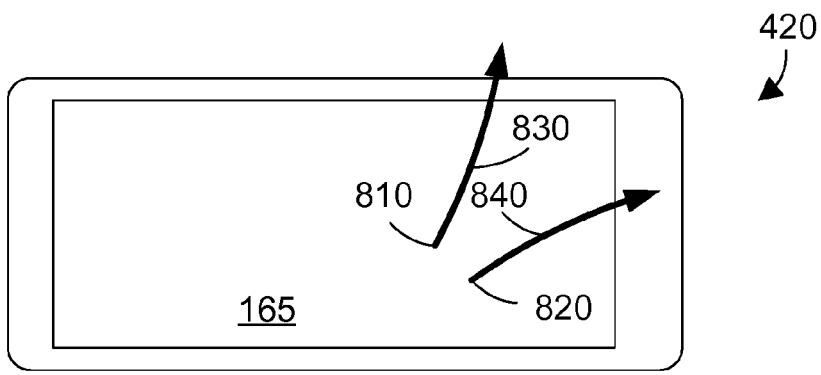
FIG. 8 is a block diagram showing an example of how a user can perform a multiple-finger swipe that results in the mobile device streaming digital content simultaneously to two different streaming devices.

In a second embodiment, a user can use a multi-finger swipe to stream digital content to two different streaming devices. Referring to FIG. 8, a user can perform a multi-finger swipe by placing two fingers close together on the touch screen 165, as shown at points 810 and 820 in FIG. 8. As the user swipes the two fingers upwards on touch screen 165, and user separates the fingers, creating two different swipes simultaneously with the two fingers, shown in FIG. 8 as swipes 830 and 840. The directional streaming mechanism detects these two simultaneous swipes 830 and 840, and can stream the digital content to two streaming devices in these two different directions at the same time. This may include determining what type of streaming device is in the direction of the swipes, and sending different types of streaming data to the two streaming devices. Thus, for the specific room configuration in FIG. 5 and the swipes 830 and 840 shown in FIG. 8, the directional streaming mechanism could stream video content without the audio to the television 420B while sending the audio content to the speakers 420C.

Figure 9:
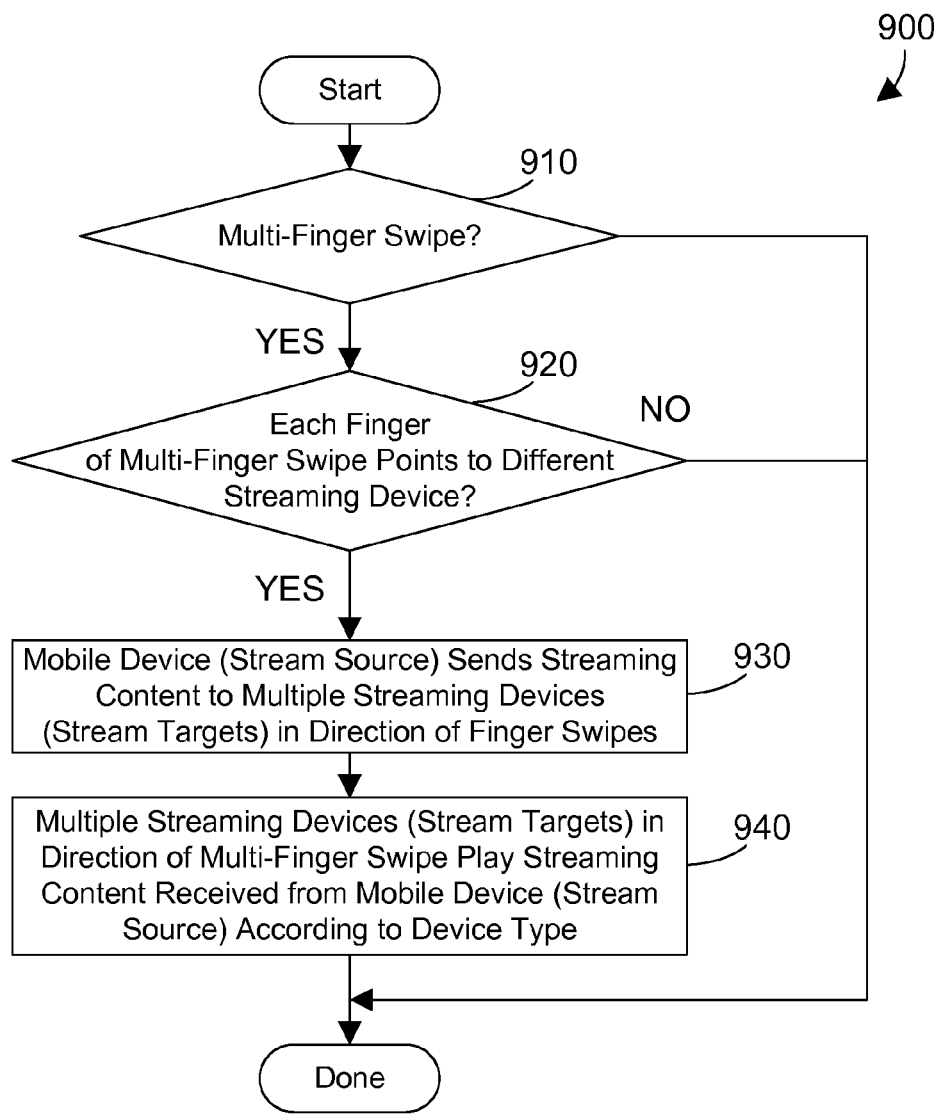
FIG. 9 is a flow diagram of a method for a mobile device to process a multiple-finger swipe as shown in FIG. 8.

Referring to FIG. 9, method 900 determines when a multi-finger swipe occurs (step 910). If not (step 910=NO), method 900 is done. When method 900 detects a multi-finger swipe (step 910=YES), method 900 determines whether each finger of the multi-finger swipe points to a different streaming device (step 920). If not (step 920=NO), method 900 is done. When each finger of the multi-finger swipe points to a different streaming device (step 920=YES), the mobile device sends the streaming content to multiple streaming devices that are stream targets in the direction of the multi-finger swipe (step 930). The multiple streaming devices in the direction of the multi-finger swipe play the streaming content received from the mobile device, and may play different streaming content based on device type (step 940). Method 900 is then done.

The directional streaming mechanism disclosed and claimed herein greatly simplifies the process for a user to stream digital content to nearby devices. Note the digital content can include any suitable type of digital content, including without limitation video data, audio data, text files, applications, photographs, etc. Thus, if a user has a file on her smart phone and wants to share the file with another user, the user can simply swipe the file in the direction of the device of the other user, which can then result in automatically transferring the file to the device of the other user without further action or input required of either user.

The disclosure and claims herein relate to a mobile device that includes a directional streaming mechanism that causes digital content to be streamed to one or more nearby devices based on a gesture on the touch screen of the mobile device, such as the swipe of a finger. The mobile device and nearby devices each include a position mechanism that allows each device to know the position of other devices within a given range. When a user is streaming digital content to the mobile device, the user can swipe a finger on a touch screen display in the direction of one of the streaming devices in range of the mobile device, which results in the mobile device streaming the digital content to the streaming device in the direction of the finger swipe. The streaming device in the direction of the finger swipe can then play the digital content received from the mobile device.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A mobile device comprising:
   at least one processor;
   a memory coupled to the at least one processor;
   a touch screen display coupled to the at least one processor;
   a streaming content comprising a plurality of streaming data types;
   an orientation mechanism that determines physical orientation of the mobile device in space;
   a position mechanism that determines location of the mobile device with respect to a plurality of streaming devices within a predetermined range of the mobile device; and
   a directional streaming mechanism residing in the memory and executed by the at least one processor that determines from the position mechanism location of the plurality of streaming devices with respect to the mobile device, detects a predefined gesture on the touch screen display by a user of the mobile device, wherein the predefined gesture comprises a multi-finger swipe by the user on the touch screen display that results in a plurality of simultaneous finger swipes, wherein each of the plurality of simultaneous finger swipes points in a different direction towards one of the plurality of streaming devices, and in response, to the direction of the plurality of finger swipes, the directional streaming mechanism determines a type for each of the plurality of streaming devices pointed to by the multi-finger swipe and based on the determined streaming device type sends from the streaming content a first type of streaming data from the mobile device to a first of the plurality of streaming devices pointed to by the multi-finger swipe and sends from the streaming content a different second type of streaming data from the mobile device to a second of the plurality of streaming devices pointed to by the multi-finger swipe.

2. The mobile device of claim 1 wherein the position mechanism comprises an Internal Position System mechanism.

3. The mobile device of claim 1 wherein when the directional streaming mechanism determines multiple streaming devices are in the direction of the predefined gesture on the touch screen display, and in response, the directional streaming mechanism displays on the touch screen display a list of the multiple streaming devices, allowing the user to select one of the listed streaming devices on the touch screen display, the directional streaming mechanism receiving the user selection from the listed streaming devices on the touch screen display, and sending the streaming content from the mobile device to the user-selected streaming device.

4. The mobile device of claim 1 wherein the position mechanism comprises an Internal Position System mechanism, wherein the directional streaming mechanism determines from the orientation mechanism the orientation of the mobile device in space and determines the location of the plurality of streaming devices within the predetermined range of the mobile device, wherein the predefined gesture comprises a multi-finger swipe on the touch screen display that results in a plurality of finger swipes that each are in the direction of multiple streaming devices, and in response, the directional streaming mechanism sends the streaming content from the mobile device to the multiple streaming devices, resulting in the multiple streaming devices playing respective streaming content based on type of each of the multiple streaming devices.

5. A computer-implemented method executed by at least one processor for sending streaming content from a mobile device to at least one of a plurality of streaming devices, the method comprising:
   streaming content comprising a plurality of streaming data types;
   determining physical orientation of the mobile device in space;
   determining location of the mobile device with respect to a plurality of streaming devices within a predetermined range of the mobile device;
   detecting a predefined gesture by a user on a touch screen display of the mobile device, wherein the predefined gesture comprises a multi-finger swipe by the user on the touch screen display that results in a plurality of simultaneous finger swipes, wherein each of the plurality of simultaneous finger swipes points in a different direction towards one of the plurality of streaming devices;
   in response to detecting the directions of multi-finger swipe by the user, determining a type for each of the plurality of streaming devices pointed to by the multi-finger swipe and based on determining the streaming device type sending a first streaming data type of the streaming content from the mobile device to a first of the plurality of streaming devices pointed to by the multi-finger swipe and sending a different second streaming data type of the streaming content from the mobile device to a second of the plurality of streaming devices pointed to by the multi-finger swipe.

6. The method of claim 5 wherein determining the location of the mobile device with respect to the plurality of streaming devices comprises using an Internal Position System mechanism in the mobile device to communicate with corresponding Internal Position System mechanisms in the plurality of streaming devices.

7. The method of claim 5 further comprising:
   determining when multiple streaming devices are in the direction of the predefined gesture on the touch screen display, and in response, displaying on the touch screen display a list of the multiple streaming devices;
   allowing the user to select one of the listed streaming devices on the touch screen display;
   receiving the user selection from the listed streaming devices on the touch screen display; and
   sending the streaming content from the mobile device to the user-selected streaming device.

8. The method of claim 5 wherein the step of determining location of the mobile device with respect to a plurality of streaming devices within a predetermined range of the mobile device comprises an Internal Position System mechanism in the mobile device communicating with corresponding Internal Position System mechanisms in the plurality of streaming devices to determine the location of the plurality of streaming devices within the predetermined range of the mobile device, wherein the predefined gesture comprises a multi-finger swipe on the touch screen display that results in a plurality of finger swipes that each are in the direction of multiple streaming devices, and in response, sending the streaming content from the mobile device to the multiple streaming devices; and
   playing respective streaming content on the multiple streaming devices based on type of each of the multiple streaming devices.

9. An article of manufacture comprising software stored on a non-transitory computer readable storage medium, the software comprising:
   streaming content comprising a plurality of streaming data types;
   a directional streaming mechanism that determines physical orientation of the mobile device in space and location of the mobile device with respect to a plurality of streaming devices within a predetermined range of the mobile device, that determines location of the plurality of streaming devices with respect to the mobile device, detects a predefined gesture on the touch screen display by a user of the mobile device, wherein the predefined gesture comprises a multi-finger swipe by the user on the touch screen display that results in a plurality of simultaneous finger swipes, wherein each of the plurality of simultaneous finger swipes points in a different direction towards one of the plurality of streaming devices, and in response, to the direction of the plurality of finger swipes, the directional streaming mechanism determines a type for each of the plurality of streaming devices pointed to by the multi-finger swipe and based on the determined streaming device type sends a first streaming data type of the streaming content from the mobile device to a first of the plurality of streaming devices pointed to by the multi-finger swipe and sends a different second streaming data type of the streaming content from the mobile device to a second of the plurality of streaming devices pointed to by the multi-finger swipe.

10. The article of manufacture of claim 9 wherein when the directional streaming mechanism determines multiple streaming devices are in the direction of the predefined gesture on the touch screen display, and in response, the directional streaming mechanism displays on the touch screen display a list of the multiple streaming devices, allowing the user to select one of the listed streaming devices on the touch screen display, the directional streaming mechanism receiving the user selection from the listed streaming devices on the touch screen display, and sending the streaming content from the mobile device to the user-selected streaming device.

11. The article of manufacture of claim 9 wherein the position mechanism comprises an Internal Position System mechanism, wherein the directional streaming mechanism determines from the orientation mechanism the orientation of the mobile device in space and determines the location of the plurality of streaming devices within the predetermined range of the mobile device, wherein the predefined gesture comprises a multi-finger swipe on the touch screen display that results in a plurality of finger swipes that each are in the direction of multiple streaming devices, and in response, the directional streaming mechanism sends the streaming content from the mobile device to the multiple streaming devices, resulting in the multiple streaming devices playing respective streaming content based on type of each of the multiple streaming devices.

* * * * *